United States Patent [19]

Dutertre et al.

[11] Patent Number: 6,145,544
[45] Date of Patent: Nov. 14, 2000

[54] FLOW CONDITIONER FOR A GAS TRANSPORT PIPE

[75] Inventors: Dominique Dutertre, Paris; Vincent De Laharpe, Antony, both of France

[73] Assignee: Gaz de France, France

[21] Appl. No.: 09/250,122

[22] Filed: Feb. 16, 1999

[30] Foreign Application Priority Data

Mar. 13, 1998 [FR] France ................... 98 03117

[51] Int. Cl.[7] .................. F15D 1/02; B01F 5/06
[52] U.S. Cl. ................. 138/39; 138/42; 366/336; 366/340
[58] Field of Search ............. 138/39, 42; 366/336, 366/337, 338, 340

[56] References Cited

U.S. PATENT DOCUMENTS

| | | |
|---|---|---|
| 2,600,733 | 6/1952 | Clift . |
| 3,572,391 | 3/1971 | Hirsch ........................ 138/37 |
| 3,667,732 | 6/1972 | Lejeune ...................... 138/37 |
| 3,840,051 | 10/1974 | Akashi et al. .............. 138/37 |
| 3,941,350 | 3/1976 | Kluczynski ................. 138/42 |
| 5,327,941 | 7/1994 | Bitsakis et al. ............. 138/42 |
| 5,495,872 | 3/1996 | Gallagher et al. .......... 138/44 |
| 5,529,093 | 6/1996 | Gallagher et al. . |

FOREIGN PATENT DOCUMENTS

| | | |
|---|---|---|
| 2717536 | 9/1995 | France . |
| 2235064 | 2/1991 | United Kingdom . |
| WO9508064 | 3/1995 | WIPO . |
| WO9519504 | 7/1995 | WIPO . |

*Primary Examiner*—James Hook
*Attorney, Agent, or Firm*—Ostrolenk, Faber, Gerb & Soffen, LLP

[57] ABSTRACT

The flow conditioner for a gas transport pipe comprises at least one perforated plate disposed essentially perpendicularly to the axis XX' of the pipe and comprising a central hole and sets of additional holes that are regularly distributed over at least three concentric rings centered on the axis of the pipe so as to define a perforated plate that is axially symmetrical. Within any one ring all of the circular holes are of the same diameter $d_1$, $d_2$, $d_3$. On going away from the central hole and on passing from any one ring to an adjacent concentric ring, the diameter of the holes changes alternately in a reduction direction and in an increase direction. Each ring has a number of holes that is equal to or greater than six. The perforated plate is advantageously associated with a porous plate situated upstream from the perforated plate and parallel thereto.

15 Claims, 6 Drawing Sheets

FLOW CONDITIONER FOR A GAS TRANSPORT PIPE

FLOW CONDITIONER FOR A GAS TRANSPORT PIPE

The present invention relates to a flow conditioner for a gas transport pipe, the conditioner comprising at least one perforated plate disposed essentially perpendicularly to the axis XX' of the pipe and including a central hole together with sets of additional holes that are regularly distributed over concentric rings centered on the axis of the pipe.

BACKGROUND OF THE INVENTION

When spinner-type gas volume meters are installed in delivery stations, downstream from expanders or obstacles such as valves, bends, double-bends, constrictions, tees, or other non-rectilinear duct elements, meter accuracy runs the risk of being affected by the disturbances such obstacles generate in the flow. One of the solutions that has been adopted until now has been to leave a long straight length of pipe between the meter and the last obstacle situated upstream therefrom. Not only is that solution detrimental to making stations compact, it also turns out that long straights are not always sufficient for sufficiently attenuating the effects of certain major disturbances.

Thus, in order to eliminate disturbances while also reducing the size of stations, it is often necessary to make use of flow conditioners. Such equipment modifies the structure of a flow, causing its characteristics to approach those of an undisturbed flow of the kind obtained downstream from very long straight lengths of pipe, known as a "fully developed" or an "established" flow.

Numerous types of flow conditioner are in existence, some of which are mentioned in the ISO 5167 standard or in the AGA Report 7 standard. Nevertheless, although existing conditioners are capable of reducing the rotation of a gas stream, known as "swirl", very few of them reduce in satisfactory manner the asymmetry of the flow or the violent jet effects that are observed downstream from certain expander-regulators. They are designed for use with upstream and downstream straights of length corresponding to several times the nominal diameter of the pipes, which limits the advantage thereof when it is desired to make expander-and-meter stations that are compact.

More particularly, patent document GB-A-2 235 064 describes a flow conditioner comprising a perforated plate having a central hole and a set of other holes distributed in concentric rings centered on the central hole. In each ring, the holes are regularly distributed and they all have the same diameter so that the device is axially symmetrical. The diameter of the holes decreases on going outwards from the central hole towards each of the concentric rings. Such a flow conditioner is quite effective, providing it is used in combination with long straight lengths of pipe, but it turns out to be insufficient for installation in a compact expander-and-meter station.

Patent document U.S. Pat. Nos. 5,495,872 and 5,529,093 describe a flow conditioner comprising a perforated plate that does not have a central hole, but that has a set of holes which are distributed essentially in two to four concentric rings centered on the center of the perforated plate. Within any one ring, the holes are regularly spaced apart and have the same diameter. The diameter of the holes varies from one ring to another. A set of three small-diameter holes at the vertices of an equilateral triangle is disposed in the center of two concentric rings to mitigate the absence of a central hole. Such a perforated plate likewise does not enable performance to be optimized and the above-mentioned documents insist on using the perforated plate in combination with an upstream device for countering gas stream swirl, the device being made up of a set of tubes and being spaced apart from the perforated plate, pipe straights of non-negligible length must also be included in the flow conditioner upstream and downstream from the perforated plate.

OBJECTS AND SUMMARY OF THE INVENTION

The present invention seeks to remedy the above-mentioned drawbacks and to make it possible with a compact device to eliminate jet effects, flow swirl, and turbulence due to the gas passing through a regulator-expander or certain duct elements such as double-bends, tees, . . . , and to obtain flow at a gas meter that is symmetrical about the axis of the pipe without any swirl of the gas stream and with turbulence at a level that is comparable to that of a fully developed flow.

These objects are achieved by a flow conditioner for a gas transport pipe, the conditioner comprising at least one perforated plate disposed essentially perpendicularly to the axis XX' of the pipe and including a central hole together with sets of additional holes that are regularly distributed over concentric rings centered on the axis of the pipe, wherein the additional holes are distributed over at least three concentric rings so as to define an axially-symmetrical perforated plate, wherein within any one ring all the circular holes have the same diameter $d_1$, $d_2$, $d_3$, wherein, on going outwards from the central hole and passing to an adjacent concentric ring, the diameter of the holes changes alternately in the reduction direction and in the increase direction, and wherein each ring comprises a number of holes equal to or greater than six.

More particularly, the perforated plate comprises around the central circular hole, on going away from the axis XX' of the pipe, an inner first ring comprising a set of holes of small diameter $d_1$, an intermediate second ring comprising a set of holes of large diameter $d_2$, and an outer third ring comprising a set of holes of diameter $d_3$ of a size intermediate between the small diameter $d_1$ and the large diameter $d_2$.

The perforated plate contributes to attenuating the disturbances and to rapid re-development of the flow downstream. The positions and dimensions of the holes are determined in such a manner that the outlet flow is symmetrical about the axis of the pipe, without any swirl of the gas stream and with turbulence at a level that is comparable to that of a fully-developed flow, such that rapid re-development of the flow is facilitated.

In a preferred embodiment, the perforated plate comprises a central hole, twelve holes of small diameter $d_1$ constituting an inner first ring, eight holes of large diameter $d_2$ constituting an intermediate second ring, and twenty holes of intermediate diameter $d_3$ constituting an outer third ring.

Advantageously, the intermediate diameter $d_3$ of the holes constituting the outer third ring of the perforated plate is close to the diameter $d_0$ of the central hole.

Preferably, the perforated plate is of thickness e substantially equal to the diameter $d_2$ of the holes of the intermediate second ring.

In optimized manner, in the perforated plate and for DI designating the inside diameter of the pipe with which the flow conditioner is associated: the holes of small diameter $d_1$ are distributed over an inner first ring of mean diameter $D_1$ equal to about 0.23 DI; the holes of large diameter $d_2$ are distributed over an intermediate second ring of mean diameter $D_2$ equal to about 0.46 DI; and the holes of intermediate diameter $d_3$ are distributed over an outer third ring of mean diameter $D_3$ equal to about 0.84 DI.

In a preferred embodiment, in the perforated plate and for DI designating the inside diameter of the pipe with which the flow conditioner is associated: the central hole has a diameter $d_0$ equal to about 0.12 DI; the holes of the inner first ring have a diameter $d_1$ equal to about 0.05 DI; the holes of the intermediate second ring have a diameter $d_2$ equal to about 0.16 DI; and the holes of the outer third ring have a diameter $d_3$ equal to about 0.12 DI.

The perforated plate may also be associated with a porous plate that is situated upstream from the perforated plate and is parallel thereto. In which case, the perforated plate serves as a mechanical support for the porous plate which may thus be subjected to a high level of thrust in the flow direction.

The porous plate improves the effectiveness of the perforated plate and presents excellent ability at making the flow homogeneous, while destroying large turbulent structures.

The porous plate is made of a homogeneous material having porosity lying in the range 90% to 96%, and whose area of contact with the flow is a function of the mesh size thereof and lies in the range 500 $m^2/m^3$ to 2500 $m^2/m^3$.

Advantageously, the porous plate has a thickness of about 10 mm and is made of a very open nickel-chromium foam.

The perforated plate or the assembly comprising the perforated plate and a porous plate is disposed in centered manner relative to the axis of the pipe and is held perpendicularly relative thereto.

Thus, in a particular embodiment, the conditioner includes an external annular support for mounting between two flanges of the pipe and within which the perforated plate is placed, optionally together with the porous plate.

The outer annular support has a downstream annular shoulder serving as an abutment for the perforated plate, and the perforated plate is held pressed against said downstream annular shoulder by means of a removable spacer ring.

In a particular embodiment, the conditioner has a porous plate interposed between the removable spacer ring and the perforated plate which is itself in abutment against the downstream annular shoulder.

According to a particular characteristic, the outer annular support has radial pressure take-offs situated respectively level with the upstream removable spacer and level with the downstream shoulder to enable differential pressure measurements to be made.

In which case, a differential pressure gauge makes it possible to monitor variations in head loss across the conditioner and thus to discover the extent to which the porous body has become clogged.

Advantageously, the conditioner of the invention is disposed downstream from a regulator-expander and upstream from a meter, and is of a size in the axial direction that does not exceed about one-third of the nominal diameter DN of the gas pipe.

BRIEF DESCRIPTION OF THE DRAWINGS

Other characteristics and advantages of the invention appear from the following description of particular embodiments given as examples and described with reference to the accompanying drawings, in which.

MORE DETAILED DESCRIPTION

A flow conditioner of the invention essentially comprises a perforated plate 3 (FIGS. 1 to 3) which is disposed essentially perpendicularly to the axis XX' of the gas transport pipe 10 and in itself already constitutes a flow conditioner of optimized effectiveness, given the distribution of openings made through the plate 3. The perforated plate 3 thus contributes to attenuating disturbances and to the rapid re-development of the flow downstream, and it can be used on its own insofar as the positions and sizes of the holes are designed to cause the outlet flow to be symmetrical about the axis of the pipe, without the gas stream swirling, and with turbulence at a level that is comparable to that in a fully developed flow, in order to facilitate rapid re-development of the flow.

Figure 2:
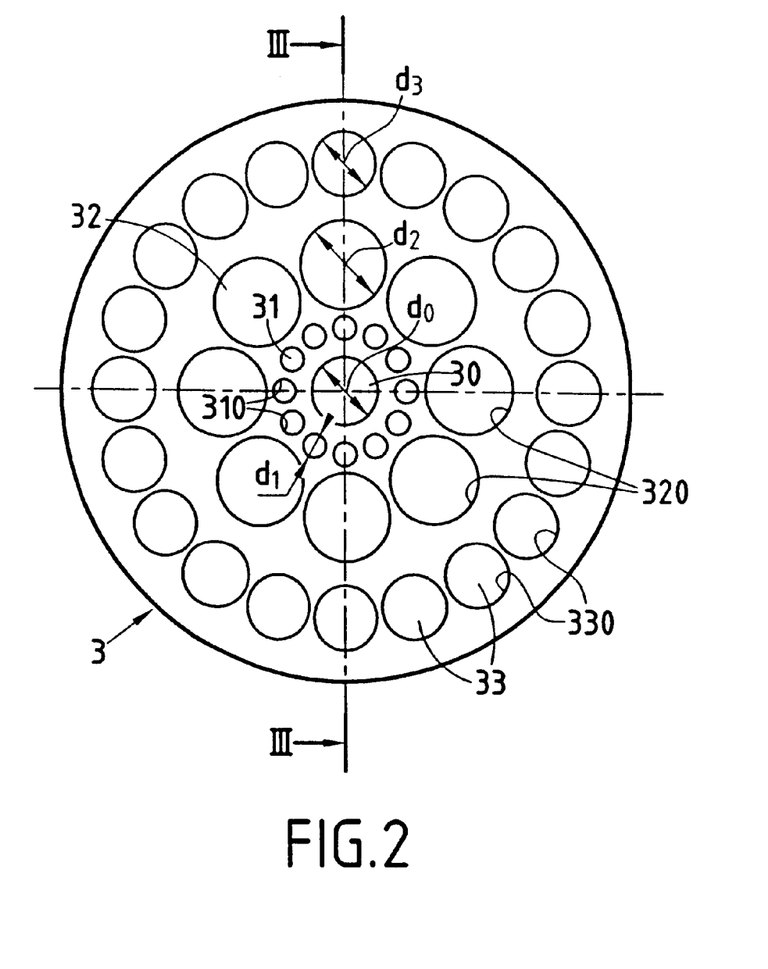
FIG. 2 is a front view of a perforated plate constituting the basic element of a conditioner of the invention.
Figure 3:
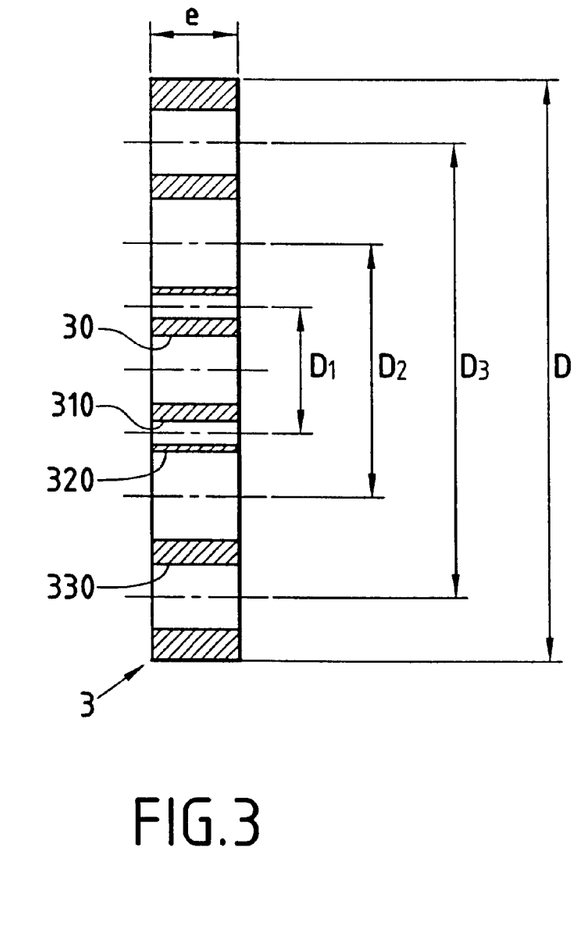
FIG. 3 is a section on line III—III of FIG. 2.

As can be seen in FIGS. 2 and 3, the perforated plate 3 comprises a central hole 30 of diameter $d_0$, an inner first ring 31 comprising a set of holes 310 of small diameter $d_1$, an intermediate second ring 32 comprising a set of holes 320 of large diameter $d_2$, and an outer third ring 33 comprising a set of holes 330 of diameter $d_3$ of a size that is intermediate between the diameters $d_1$ and $d_2$.

The thickness of the perforated plate 3 is preferably close to the diameter $d_2$ of the holes 320 of the intermediate ring 32.

In the example shown in FIGS. 2 and 3, the inner ring 31 has twelve holes 310 whose centers are regularly distributed on a circle of diameter $D_1$. The intermediate ring 32 has eight holes 320 whose centers are regularly distributed on a circle of diameter $D_2$, and the outer ring 33 has twenty holes 330 whose centers are regularly distributed on a circle of diameter $D_3$.

The holes 330 of the outer ring 33 are advantageously of a diameter $d_3$ that is close to the diameter of the central hole 30.

By way of example, for DI representing the inside diameter of the gas transport pipe 10, the parameters of the perforated plate 3 can be as follows:

| | |
|---|---|
| e = 0.162 DI | $D_2$ = 0.226 DI |
| $d_0$ = 0.123 DI | $D_2$ = 0.461 DI |
| $d_1$ = 0.046 DI | $D_3$ = 0.844 DI |
| $d_2$ = 0.162 DI | |
| $d_3$ = 0.119 DI | |

Figure 1:
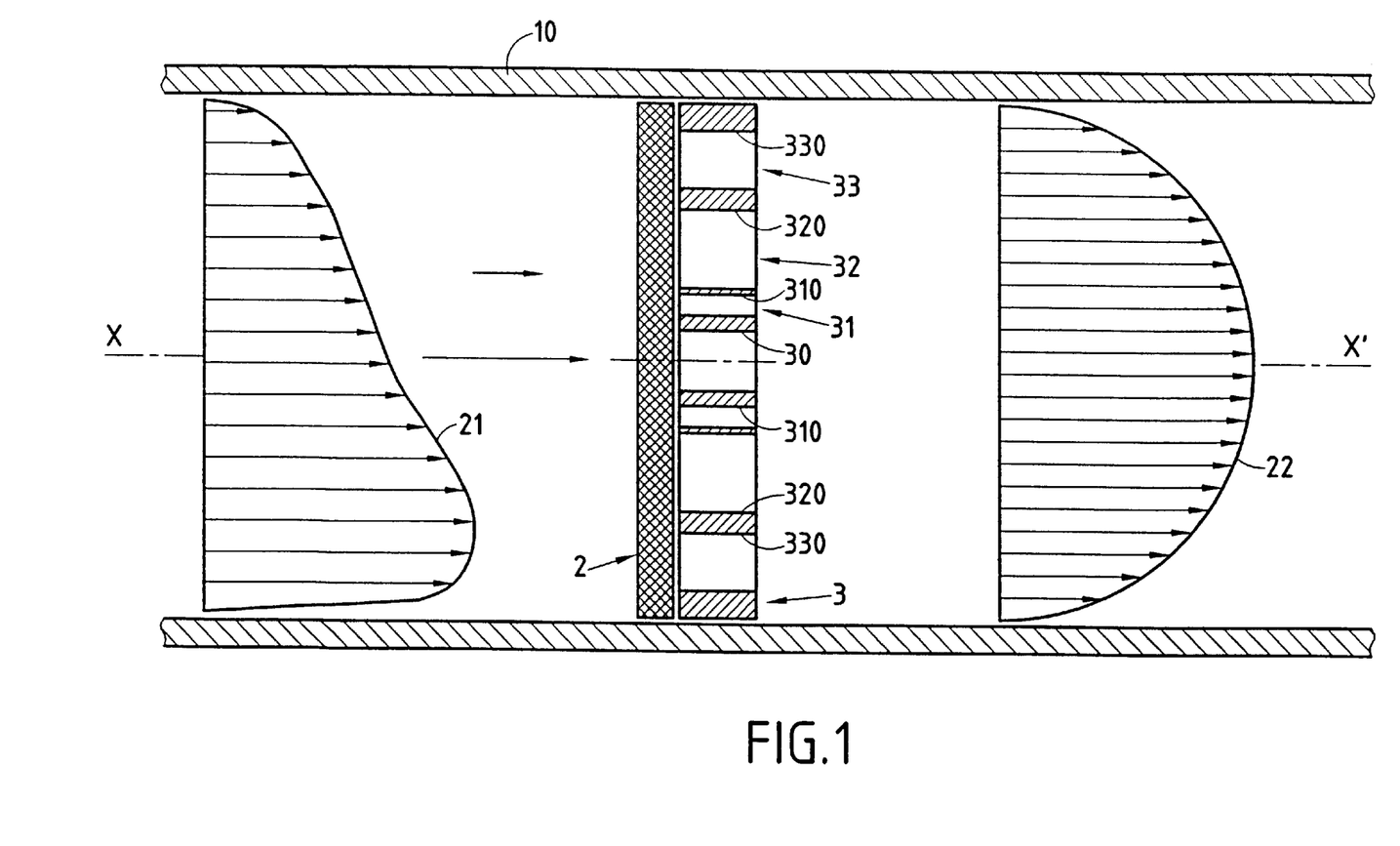
FIG. 1 is an axial section view of a pipe fitted with a flow conditioner of the invention and showing the modifications made to the flow of gas by the conditioner.

Because of the way the holes are distributed, and in particular because of the presence of an inner first ring 31 constituted by a set of small holes 310 disposed around the central hole 30 of relatively large diameter $d_0$, the perforated plate 3 makes it possible to convert a disturbed flow 21 into an established flow 22 whose characteristics are satisfactory in numerous cases (FIG. 1).

Nevertheless, the effectiveness of the flow conditioner can be improved if the perforated plate 3 which occupies the entire gas flow section is associated with a porous plate 2 that is placed upstream from the perforated plate 3 being put into contact therewith so that the entire gas flow passes through both elements 2 and 3 (FIG. 1). The perforated plate 3 then also serves as a mechanical support for the porous plate 2 which can itself be subjected to a large amount of thrust in the flow direction, proportional to the head loss it develops. The porous plate 2 contributes to eliminating asymmetries and to attenuating high levels of turbulence.

The porous plate 2 has excellent ability to homogenize the flow while destroying large turbulent structures. The material used is a homogeneous material of porosity lying in the range 90% to 96% (empty fraction relative to total volume). The area in contact with the flow is a function of mesh size and lies in the range 500 $m^2/m^3$ for a coarse mesh to 2500 $m^2/m^3$ for a fine mesh. Consequently, the finer the mesh the greater the head loss due to viscosity. For air at atmospheric pressure and travelling at a speed of 10 $m.s^{-1}$, the head loss coefficient (head loss/dynamic pressure) of a 10 mm thick plate 2 of porous material lies in the range 2.7 to 15.7.

By way of example, the porous material of the porous plate 2 can be constituted by a very open nickel-chromium foam as sold under the name Celmet by Sumitomo Europe LTD.

Figure 7:
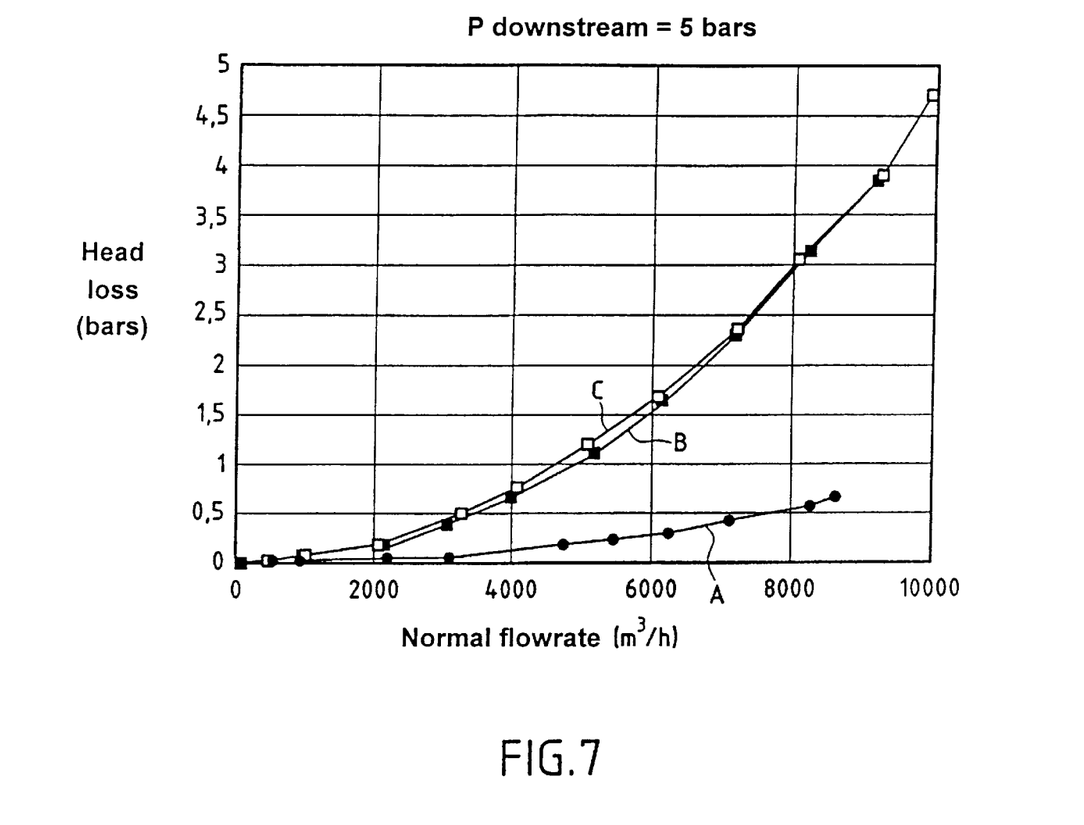
FIG. 7 is a graph in which the curves show the head losses of various porous plates that can be used in a flow conditioner of the invention.

FIG. 7 has a curve showing the head loss in bars developed by a plate of Celmet having a diameter of 80 mm and a thickness of 10 mm as a function of normal flow in $m^3/h$ (flow rate reduced to normal conditions of pressure and temperature, i.e. 1.013 bars and 273.15 K) and for constant downstream pressure of 5 bars.

The density of the porous material used can be adapted depending on requirements. A finer grain is more effective in eliminating flow disturbances while a coarser grain avoids the risk of clogging. The grain size selected is a compromise between those two constraints.

In FIG. 7, curve A corresponds to coarse-grain Celmet, curve B corresponds to fine-grain Celmet, and curve C corresponds to fine-grain Celmet after use for one year in a gas transport network.

Examples of how a flow conditioner of the invention can be mounted between two flanges 11 and 12 of a pipe 10 are described below with reference to FIGS. 4 to 6.

In order to ensure that the assembly constituted by the flow conditioner proper, whether constituted by a perforated plate 3 (FIG. 4) or by an assembly comprising a perforated plate 3 and a porous plate 2 (FIGS. 5 and 6), is properly centered relative to the axis of the pipe 10, and in order to maintain the active elements 2, 3 of the flow conditioner perpendicular to the pipe 10, these active elements 2, 3 are held in a ring-shaped support 4, 4' itself held between the flanges 11 and 12 of upstream and downstream lengths of duct 10.

A removable spacer ring 1A (FIG. 4), 1B (FIG. 5), or 1C (FIG. 6), of thickness in the axial direction adapted both to the thickness of the support ring 4, 4' and to the thickness of the active element(s) 2, 3 of the flow conditioner serves to hold the perforated plate 3 (FIG. 4) or the assembly comprising the porous plate 2 and the perforated plate 3 (FIGS. 5 and 6) against a downstream annular shoulder 41, 41' formed in the outer annular support 4, 4' to serve as an abutment.

The support 4, 4' is thus pierced by a circular opening which is concentric to the support piece itself and which is in two portions. The upstream portion which occupies nearly the entire length of the piece 4, 4' is pierced by a diameter corresponding to the outside diameter of the pieces 1A, 1B, 1C, 2, and 3 so that the pieces 1A, 3 or 1B, 2, 3, or 1C, 2, 3 are received in the support 4, 4'. The downstream portion is pierced with a slightly smaller diameter, equal to the inside diameter of the gas transport pipe 10 so as to define a shoulder 41, 41' against which the stack constituted by the above-mentioned pieces rests.

The sum of the thicknesses of the three pieces (ring 1B or 1C, porous plate 2, and perforated plate 3) must be slightly greater than the length of the circular opening in the support 4, 4' in which these pieces are stacked as measured between the shoulder 41, 41' and the upstream face thereof, so that when the assembly is clamped between the flanges 11 and 12 the porous body 2 is slightly crushed and the stack is completely blocked. This prevents any play that could give rise to vibration and noise. Sealing is provided by two O-rings 8 and 9 received in grooves machined in each of the faces of the support 4, 4' that come into contact with the raised faces of the flanges 11, 12.

The inside diameters of the shoulder 41, 41' of the support 4, 4' and of the ring 1A, 1B, 1C are identical and equal to the inside diameter of the duct 10 so that there is no sudden change of inside diameter to disturb the flow.

An optional radial hole (5) pierced through the support 4, 4' enables exhaust from the pilot of an expander to be connected thereto when the conditioner is mounted directly downstream therefrom. When the device is placed directly downstream from an expander, this has the advantage of making it possible for the flow through the pilot system to be included in the metered flow. This hole opens out into the porous plate 2. This has the effect of diffusing the jet caused by the pilot flow, thereby attenuating the asymmetry that would otherwise be generated at low flow rates and in the absence of the conditioner.

A shoulder 42, 42' is provided at the periphery of the downstream face of the support 4, 4' so as to facilitate centering the assembly relative to the downstream flange 12. This shoulder 42, 42' fits around the raised face 120 of the flange 12 on the downstream pipe. The thickness of the shoulder 42, 42' must be less than the thickness of the contact face 120 of the flange 12 so that contact takes place via the O-ring 8 and not via the shoulder 42, 42'.

Figure 4:
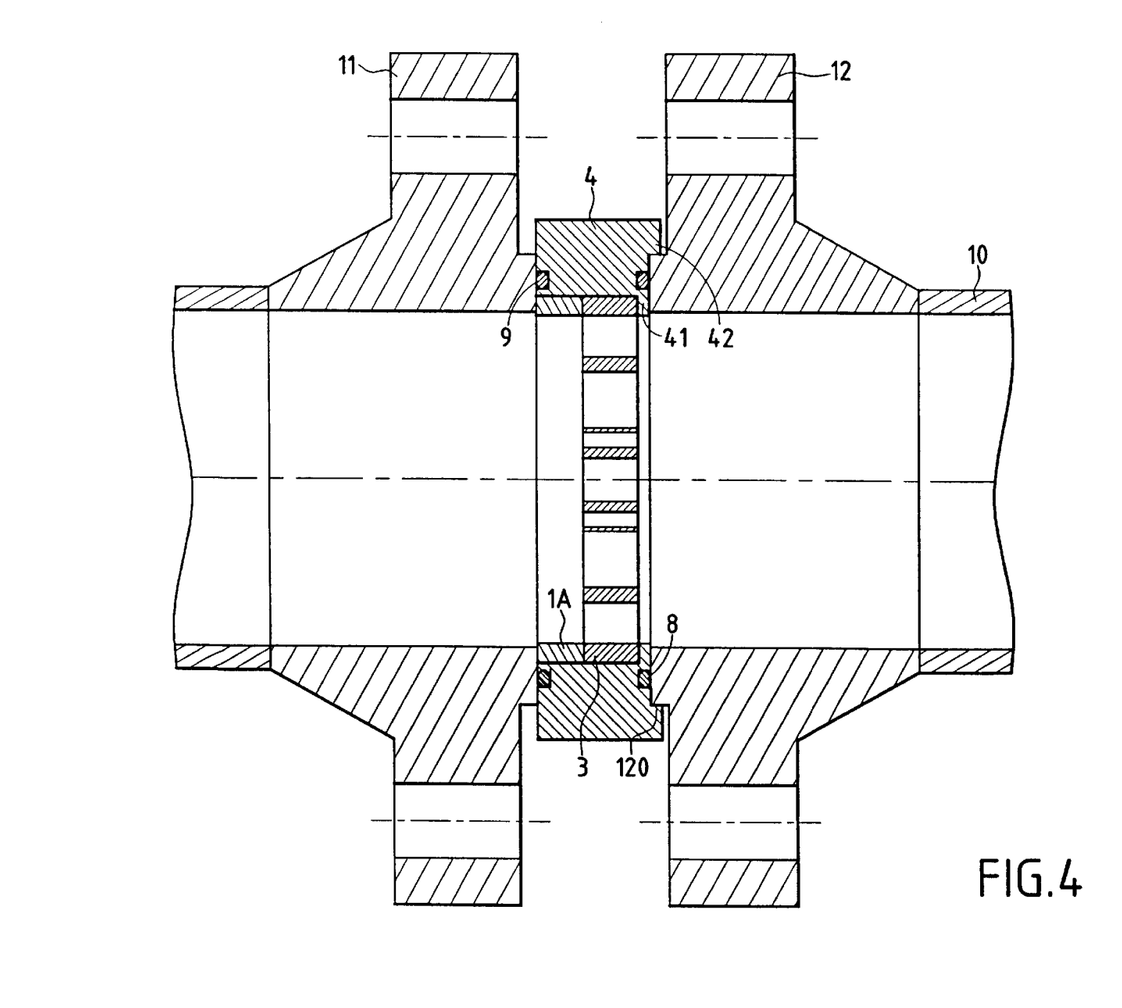
FIG. 4 is an axial section view showing an example of how the perforated plate of FIGS. 2 and 3 can be mounted by means of a ring-shaped support.
Figure 5:
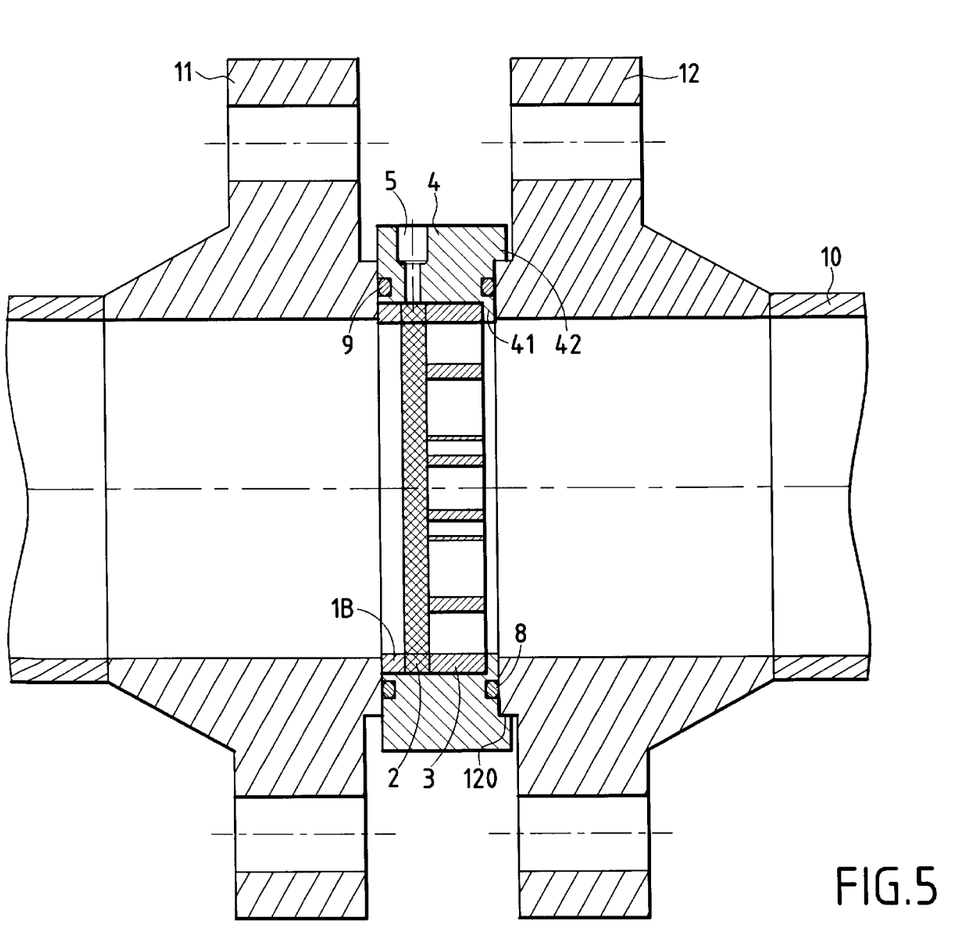
FIG. 5 is an axial section view analogous to that of FIG. 4, but showing how a flow conditioner is implemented that comprise both a perforated plate and a porous plate.
Figure 6:
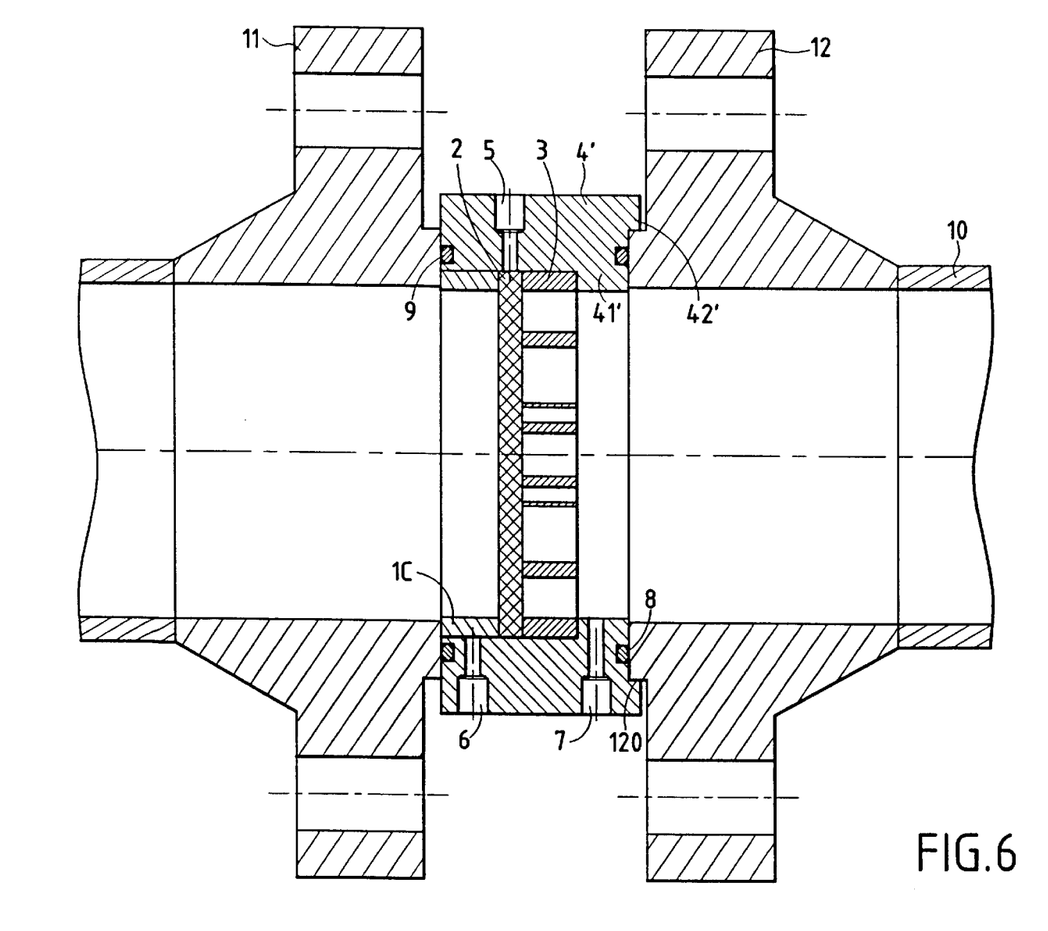
FIG. 6 is an axial section view analogous to that of FIG. 5 but also showing pressure take-offs made in the ring-shaped support.

In the embodiment of FIG. 6, the width of the support 4' is greater than that of the support 4 in FIGS. 4 and 5 so as to enable two radial holes 6 and 7 to be provided, one of them (hole 6) being situated upstream from the porous plate 2 and the other one (hole 7) being situated downstream from the perforated plate 3.

By connecting a differential pressure gauge to these two holes 6 and 7, it is possible to monitor variation of head loss across the conditioner, and thus to ascertain the extent to which the porous body 2 is becoming clogged. This is particularly advantageous downstream from a high degree of expansion in zones where the gas contains a large amount of substances that are liable to condense.

The conditioner of the invention is particularly suitable for being mounted downstream from a regulator-expander in a gas delivery station, and the head loss across the porous plate 2 can then be relatively large without difficulty. In general, the conditioner of the invention is adapted to be suitable for being placed directly downstream from any of the obstacles that are normally to be found in gas delivery stations, such as bends, double-bends, diverging portions, converging portions, etc. . . .

The flow conditioner of the invention is designed to be capable of being placed not only against the upstream flange 12 of a length of downstream pipe, but also directly against the upstream flange 12 of a gas meter, such as a spinner meter, without there being any need to leave a long straight between the conditioner and the meter.

Thus, with a flow conditioner of the invention, it is possible to eliminate the long straights that are normally recommended between the meter and the last obstacle, which straights are of various recommended lengths over the range 5 DN to 10 DN depending on country and on gas company. For example the American AGA 7 standard concerning spinner meters recommends a standard configuration in which a conditioner is used that leaves at least 5 DN between the downstream face of the conditioner and the meter, and 10 DN between the meter and the last obstacle, where DN represents the nominal diameter of the pipe (e.g. 150 mm).

In the axial direction, the flow conditioner of the invention is very small, and its length may be less than DN/3.

It will be observed that with the assembly completely located between flanges and not inserted inside a straight portion of pipe, mounting and dismounting are facilitated. The assembly can be withdrawn by removing half of the bolts. There is no need to remove a portion of pipe.

The disposition of various concentric elements 1A, 3; 1B, 2, 3; 1C, 2, 3 as a stack in a support 4, 4' makes it easy to modify the configuration of the conditioner and to add or remove a porous plate 2 at will without modifying the configuration of the gas delivery station.

The presence of a porous plate 2 has the advantage of protecting the meter against being struck by debris or blocks of ice or hydrates which could damage the blades of the meter if it is constituted by a spinner meter.

What is claimed is:

1. A flow conditioner for a gas transport pipe having an axis XX', the conditioner comprising at least one perforated plate disposed essentially perpendicularly to the axis XX' of the pipe and including a central circular hole together with sets of additional circular holes that are regularly distributed over concentric rings centered on the axis of the pipe, wherein the additional circular holes are distributed over at least three concentric rings so as to define an axially-symmetrical perforated plate, wherein within any one ring all the additional circular holes have a same diameter $d_1$, $d_2$, $d_3$, wherein, on going outwards from the central hole and passing to an adjacent concentric ring, the diameter of the holes changes alternately in a reduction direction and in an increase direction, wherein each ring comprises a number of holes equal to or greater than six.

2. A flow conditioner according to claim 1, wherein the perforated plate comprises a central hole, twelve holes of small diameter $d_1$ constituting an inner first ring, eight holes of large diameter $d_2$ constituting an intermediate second ring, and twenty holes of intermediate diameter $d_3$ constituting an outer third ring.

3. A flow conditioner according to claim 1, wherein the perforated plate comprises around the central circular hole, on going away from the axis XX' of the pipe, an inner first ring comprising a set of holes of small diameter $d_1$, an intermediate second ring comprising a set of holes of large diameter $d_2$, and an outer third ring comprising a set of holes of intermediate diameter $d_3$ of a size intermediate between the small diameter $d_1$ and the large diameter $d_2$.

4. A flow conditioner according to claim 3, wherein the intermediate diameter $d_3$ of the holes constituting the outer third ring of the perforated plate is close to a diameter $d_0$ of the central hole.

5. A flow conditioner according to claim 3, wherein the perforated plate is of a thickness θ substantially equal to the large diameter $d_2$ of the holes of the intermediate second ring.

6. A flow conditioner according to claim 3, wherein, in the perforated plate and for D1 designating an inside diameter of the pipe with which the flow conditioner is associated; the holes of small diameter $d_1$ are distributed over an inner first ring of mean diameter $D_1$ equal to about 0.23 D1; the holes of large diameter $d_2$ are distributed over an intermediate second ring of mean diameter $D_2$ equal to about 0.46 D1; and the holes of intermediate diameter $d_3$ are distributed over an outer third ring of mean diameter $D_3$ equal to about 0.84 D1.

7. A flow conditioner according to claim 3, wherein, in the perforated plate and for D1 designating an inside diameter of the pipe with which the flow conditioner is associated; the central hole has a diameter $d_0$ equal to about 0.12 D1; the holes of the inner first ring have a small diameter $d_1$ equal to about 0.05 D1; the holes of the intermediate second ring have a large diameter $d_2$ equal to about 0.16 D1; and the holes of the outer third ring have an intermediate diameter $d_3$ equal to about 0.12 D1.

8. A flow conditioner according to claim 1, wherein the perforated plate is associated with a porous plate that is situated upstream from the perforated plate and that is parallel thereto.

9. A flow conditioner according to claim 8, wherein the porous plate is made of a homogeneous material having porosity lying in the range 90% to 96%, and whose area of contact with a flow is a function of the mesh size thereof and lies in the range 500 $m^2/m^3$ to 2500 $m^2/m^3$.

10. A flow conditioner according claim 8, wherein the porous plate has a thickness of about 10 mm and is made of a very open nickel-chromium foam.

11. A flow conditioner according to claim 1, including an outer annular support for mounting between two flanges of the pipe and within which the perforated plate is placed together with the porous plate.

12. A flow conditioner according to claim 11, wherein the outer annular support has a downstream annular shoulder serving as an abutment for the perforated plate, and wherein the perforated plate is held pressed against said downstream annular shoulder by means of a removable spacer ring, the porous plate being interposed between the removable spacer ring and the perforated plate which is itself in abutment against the downstream annular shoulder.

13. A flow conditioner according to claim 12, wherein the outer annular support has radial pressure take-offs situated respectively level with the upstream removable spacer and level with the downstream shoulder to enable differential pressure measurements to be made.

14. A flow conditioner according to claim 1, disposed downstream from a regulator-expander and upstream from a meter, and is of a size in an axial direction that does not exceed about one-third of a nominal diameter DN of the gas pipe.

15. A flow conditioner according to claim 14, wherein the perforated plate is associated with a porous plate that is situated upstream from the perforated plate and that is parallel thereto, wherein the conditioner includes an external annular support for mounting between two flanges of the pipe and within which the perforated plate is placed together with the porous plate, and wherein the outer annular support is pierced by a radial hole for connecting an exhaust from a pilot of the regulator-expander, which radial hole is situated level with the porous plate to diffuse a jet caused by a pilot flow.

* * * * *